United States Patent [19]

Kastner

[11] 4,134,296
[45] Jan. 16, 1979

[54] FLOW METER

[75] Inventor: Hans-Jürgen Kastner, Schriesheim, Germany

[73] Assignee: Bopp & Reuther GMBH, Mannheim-Waldhof, Germany

[21] Appl. No.: 887,863

[22] Filed: Mar. 20, 1978

[30] Foreign Application Priority Data

Mar. 19, 1977 [DE] Fed. Rep. of Germany ....... 2712219

[51] Int. Cl.² .............................................. G01F 1/32
[52] U.S. Cl. .............................................. 73/194 VS
[58] Field of Search .................................... 73/194 VS

[56] References Cited

U.S. PATENT DOCUMENTS 3,796,095  3/1974  Fussell, Jr. .............................. 73/194

*Primary Examiner*—Herbert Goldstein
*Attorney, Agent, or Firm*—Michael J. Striker

[57] ABSTRACT

A flow meter in which a bluff body of elongated cross-section extends substantially normal to the axis of a conduit through which a fluid, which may be a liquid or a gas, passes so that vortices or whirls alternatingly breaking away from the body are formed in the fluid to opposite sides of the body, and in which the frequency of the alternatingly breaking vortices is proportionate to the speed, respectively the volume per time unit, of the fluid passing through the conduit. This frequency is measured by at least one feeler arranged in a measuring conduit located outside the first-mentioned conduit and in which the measuring conduit communicates through bores with the interior of the first-mentioned conduit to opposite sides of the bluff body.

7 Claims, 5 Drawing Figures

FLOW METER

BACKGROUND OF THE INVENTION

The present invention relates to a flow meter, in which a bluff body of elongated cross-section extends substantially normal to the axis of a conduit through which a fluid, which may be a liquid or a gas, passes, so that vortices are formed in the liquid to opposite sides of the body which alternatingly break away from the latter. The frequency of the alternatingly breaking vortices is proportionate to the speed, respectively the volume per time unit, of the fluid passing through the conduit and this frequency is measured by at least one feeler arranged in a measuring conduit located outside the first-mentioned conduit and in which the outer ends of the measuring conduit communicate through bores with the interior of the first-mentioned conduit to opposite sides of the bluff body.

Such a flow meter has the advantage that the feeler is arranged, not as usual on or in the bluff body and therewith in the mainstream passing through the conduit, but in which the feeler is located in a measuring conduit provided outside of the main conduit. In this way the feeler may be easily exchanged during the operation of the flow meter and in addition it is protected from any mechanical damage, which may be caused by particles taken along by the fluid passing through the main conduit.

In flow meters of the aforementioned kind it is known to arrange the ends of the bores which communicate with the main conduit at the rear region of the bluff body, as considered in the direction of the flow of the fluid flowing through the main conduit, whereby both inner ends are arranged in a plane which is normal to the longitudinal axis of the main conduit, that is, both inner ends are located directly in the region of the leading vortices. The vortices which, according to Karman's street of vortices detach itself alternatingly from the bluff body, will cause at the bores alternating pressure variations, which will produce in the measuring conduit, due to the momentarily produced pressure difference, an alternating fluid stream, the frequency of which is sensed by the feeler and indicated as a measurement for the speed of the fluid passing through the main conduit.

Due to the irregularity of the departing vortices directly in the vortex region, such irregularities are transmitted through the bores also onto the movement of the fluid in the measuring conduit, so that a usable signal output is only obtainable at low frequencies, that is, at a large nominal width of the flow meter. However, at small monimal widths and therewith connected high vortex frequencies, a sure signal reception is not assured, since the irregularities of the movement of the fluid occurring in the measuring conduit, which are due to the not always simultaneously occurring of plus and minus impulses, lead to super impositions and therewith to disturbances in the measuring conduit. In addition it is possible, since the fluid medium in the measuring conduit only pendulates, that during measuring of gas, condensate and during measuring of liquid, gas carried thereby will accumulate in the measuring conduit, so that the signal will be changed or completely extinguished.

SUMMARY OF THE INVENTION

It is an object of the present invention to provide a flow meter operating according to the above-mentioned principle, which at all, that is also at high vortex frequencies will assure a perfect indication of the speed of the fluid passing through a conduit.

With these and other objects in view, which will become apparent as the description proceeds, the flow meter for measuring the speed of the fluid passing through a conduit mainly comprises a turbulence producing bluff body extending normal to the axis of a conduit through the interior of the latter to produce in the fluid passing through the conduit to opposite sides of the body vortices which alternatingly brake away from the body and the frequency of which is proportionate to the speed of the fluid passing through the conduit, a measuring conduit outside the first-mentioned conduit in which open ends of the measuring conduit communicate through a pair of bores with the interior of the first-mentioned conduit and in which an inner end of one of the bores communicates with the first-mentioned conduit at one side of the bluff body and slightly upstream of a front face thereof, whereas an inner end of the other of the bores communicates with the interior of the first-mentioned conduit at the other side of the bluff body and slightly downstream of the mentioned front face and in which a feeler for measuring the frequency of the alternatingly breaking vortices is located in the above-mentioned measuring conduit.

The bluff body has an elongated cross-section in the direction of flow of the fluid passing through the first-mentioned conduit and the inner end of the other bore is preferably located at about the first third of the cross-section of the bluff body.

The inner end of the one bore which is located slightly upstream of the front face of the bluff body will receive very uniform and smooth pressure variations, which are released by the vortices street of Karman and which extend to this inner end. The inner end of the other bore located in the region of the bluff body will receive, due to its nearness to the vortex zone, very strong pressure variations, however, with disturbing waves of low and high frequency superimposed since the Karman street of vortices produces a hydrodynamic instability so that necessarily additional and secondary vortices are present.

Due to the cooperation of the two displaced inner ends of the bores, the two essentially diferent forms of the pressure variations, that is, in the front smooth and uniform, but relatively weak and in the rear slightly varying, but rather strong, are combined to a proper signal. The different impulses support each other in the measuring conduit, as shown by experiments, in a surprising manner so favorably that a clear well-defined strong signal is obtained, even at high frequencies. Due to the static pressure difference, which is always present between the inner ends of the first and the second bore, an advancing impulse wave is created, which is initiated by the rear bore and which is formed by the front bore. Thereby any disturbing additional pulsations are smoothed, respectively filtered out.

Due to the static pressure difference between the two bores, the measuring conduit will also be automatically ventilated, if the flow meter is used for measuring the speed of a liquid passing therethrough, or drained, if the speed of a gas is to be measured.

Preferably, two pairs of bores may be provided in which the inner ends of one pair of bores are mirror-symmetrically arranged with respect to the inner ends of the other pair, whereas the outer ends of the bores are respectively connected to two separate measuring conduits, in each of which a feeler is located. In this way two signals in phase opposition are created, which, by means of a simple circuit, can be used for surveyance of the signals so that a disturbance in the function may be immediately indicated. With the two signals produced in phase opposition it is also possible to obtain, by means of a differential circuit, an extremely high signal amplitude, which will assure even at above normal frequency regions still a proper signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
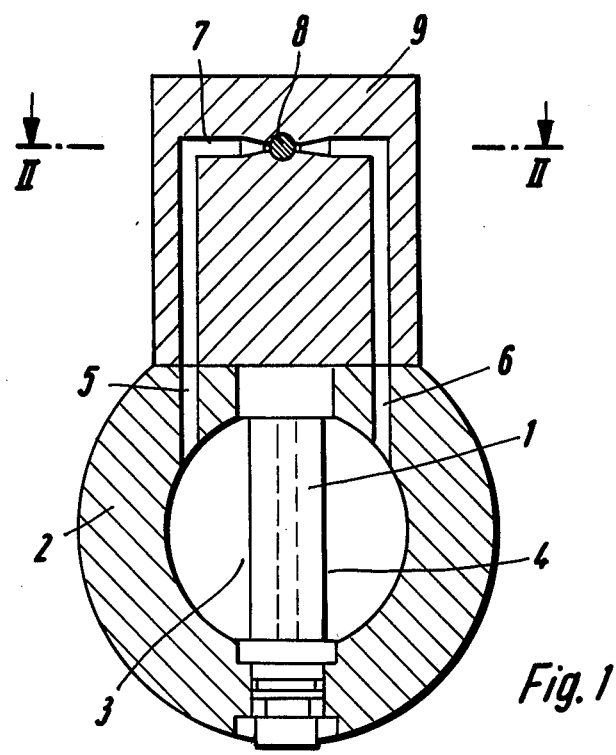
FIG. 1 illustrates in cross-section a first embodiment of a flow meter according to the present invention.
Figure 2:
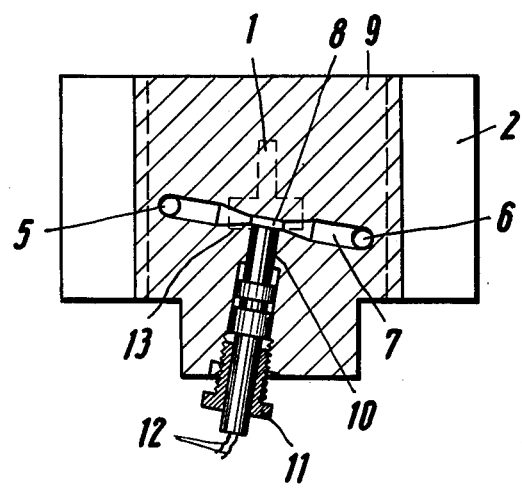
FIG. 2 is a cross-section taken along the line II—II of FIG. 1.

Referring now to the drawing and more specifically to FIGS. 1 and 2, it will be seen that the flow meter illustrated therein comprises a vortex producing bluff body 1 extending normal to the axis of a conduit 2 through the interior of the latter and the conduit 2 is flown through by fluid, that is a liquid or a gas, the speed of which has to be measured by the flow meter. The bluff body 1 produces to opposite sides 3 and 4 thereof vortices alternatingly breaking away from the body 1, the frequency of which is proportionate to the speed of the fluid passing through the conduit 2. This frequency is transmitted by means of two bores 5 and 6 through the wall of the conduit 2 and a measuring conduit 7 located outside of the main conduit 2 to a feeler element 8 located in the measuring conduit 7. The measuring conduit 7 and the feeler 8 are located in a feeler head 9 connected in any convenient manner, not shown in the drawing, to a flattened outer surface portion of the main conduit 2. The feeler element 8 is mounted in a tubular support 10 (FIG. 2) which is inserted in a sealed manner in a bore provided in the feeler head 9 and the tubular support 10 is held in position by a screw bushing 11 screwed into a properly threaded portion of the aforementioned bore. The inpulses imparted to the feeler 8 are transmitted to the outside by electrical conductors 12 which may be connected to an indicator instrument of known construction, not shown in the drawing. The bores 5 and 6 are preferably parallel to the longitudinal axis of the bluff body 1.

According to the present invention the bore 6 communicates at its inner end with the space 4 in the interior of the conduit 2 to one side of the bluff body 1 and slightly upstream of a front face 13 of the bluff body 1 which is adapted to be impinged by the fluid passing through the interior of the conduit 2. The inner end of the bore 5 communicates with the interior of the conduit 2 at the other side 3 of the bluff body 1 and slightly downstream of the front face 13 of the latter, preferably at the border of the vortex zone about in the first third of the elongated bluff body 1, as measured in the direction of the fluid flow passing through the interior of the conduit 2.

Figure 3:
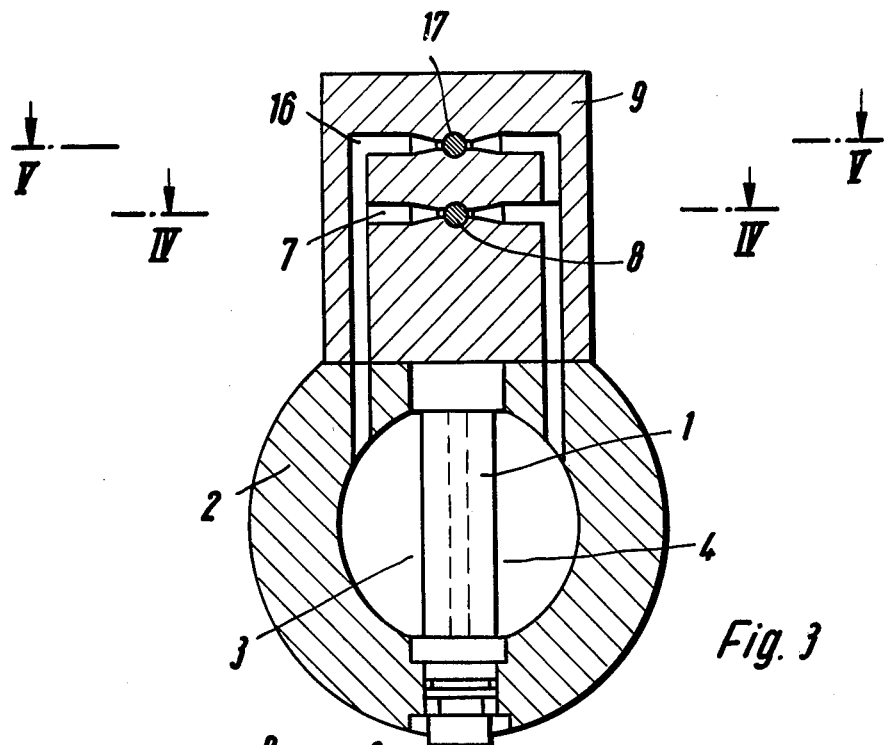
FIG. 3 illustrates in cross-section a second embodiment according to the present invention.
Figure 4:
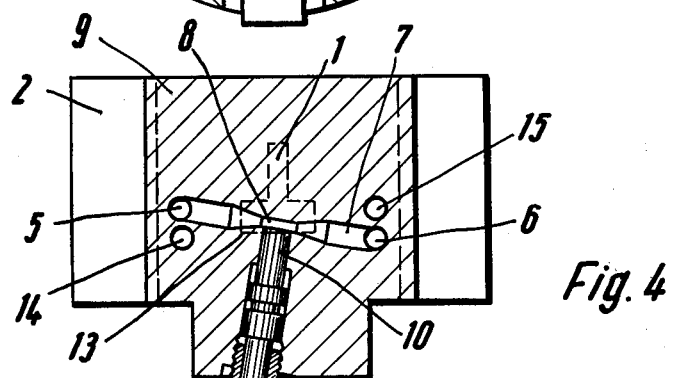
FIG. 4 is a cross-section taken along the line IV—IV of FIG. 3.
Figure 5:
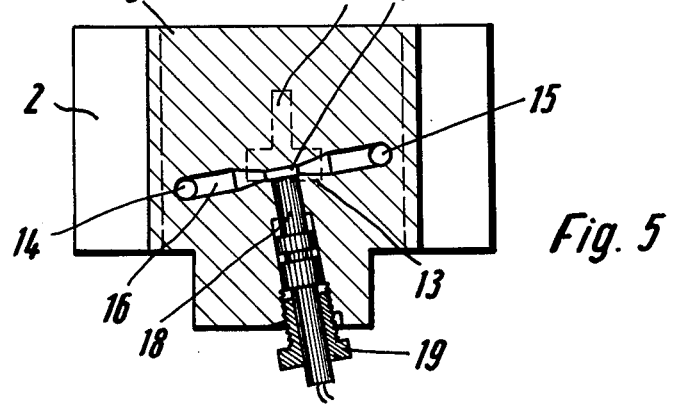
FIG. 5 is a cross-section taken along the line V—V of FIG. 3.

In the embodiment shown in FIGS. 3–5 two pairs of bores, that is the bores 5, 6 and 14, 15 are provided which are arranged mirror-symmetrically with respect to each other. The bores 5 and 6 are connected to each other by a measuring conduit 7 with a feeler element 8 provided therein, whereas the bores 14 and 15 are connected by means of a measuring conduit 16 to act on a feeler element 17 provided in the conduit. The feeler element 8 is supported in the manner as described in connection with FIG. 2, and the feeler element 17 likewise is supported in a tubular support 18 located in a sealed manner in a corresponding bore in the feeler head 9 and held in place by a screw bushing 19. Both tubular supports 10 and 18 may easily be assembled or disassembled with the remainder of the flow meter, even during operation of the latter, so that the feeler elements 8 and 17 may be replaced any time such a replacement appears necessary.

It will be understood that each of the elements described above, or two or more together, may also find a useful application in other types of flow meters differing from the types described above.

While the invention has been illustrated and described as embodied in a flow meter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a flow meter for measuring the speed of a fluid passing through a conduit, a combination comprising a turbulence producing bluff body extending substantially normal to the axis of the conduit through the interior of the latter to produce in the fluid passing through the conduit to opposite sides of said body vortices which alternatingly break away from the body and the frequency of which is proportionate to the speed of the fluid passing through said conduit, said body having a front face adapted to be impinged by the fluid passing through the conduit; a measuring conduit outside said first-mentioned conduit, said measuring conduit having a pair of open ends; a pair of bores each having one end communicating with the respective open end of said measuring conduit and another end communicating with the interior of said first-mentioned conduit, the other end of one of said bores communicating with said first-mentioned conduit to one side of said bluff body and slightly upstream of the front face thereof and the other end of the other of said bores communicating with the interior of said first-mentioned conduit at the other side of said bluff body and slightly downstream of said front face; and a feeler for measuring said frequency located in said measuring conduit.

2. A combination as defined in claim 1, wherein said bluff body has an elongated cross-section in the direction of the flow of fluid passing through said first-mentioned conduit, and wherein the other end of said other bore is located at about the first third of the cross-section of the bluff body, as seen in the direction of the fluid passing through said first-mentioned conduit.

3. A combination as defined in claim 1, wherein said bluff body has a substantially T-shaped cross-section.

4. A combination as defined in claim 1, and including a feeler head fixedly mounted on said first-mentioned conduit, said measuring conduit and said feeler being located in said feeler head.

5. A combination as defined in claim 4, wherein said bores extend substantially parallel to said bluff body.

6. A combination as defined in claim 4, and including tubular support means passing in a sealed manner through said measuring head for supporting said feeler, said tubular support means having an outer end projecting beyond said measuring head and a pair of conductors connected to said feeler and passing through said tubular support means to the outside of said measuring head.

7. A combination as defined in claim 1, wherein two pairs of bores are provided, wherein the other ends of one pair of said bores are mirror-symmetrically arranged with respect to the other ends of the other pair and wherein the one end of one pair communicates respectively with the open ends of a first measuring conduit and the one end of the other pair communicates with the open ends of a second measuring conduit, and a feeler in each measuring conduit.

* * * * *